2,477,042

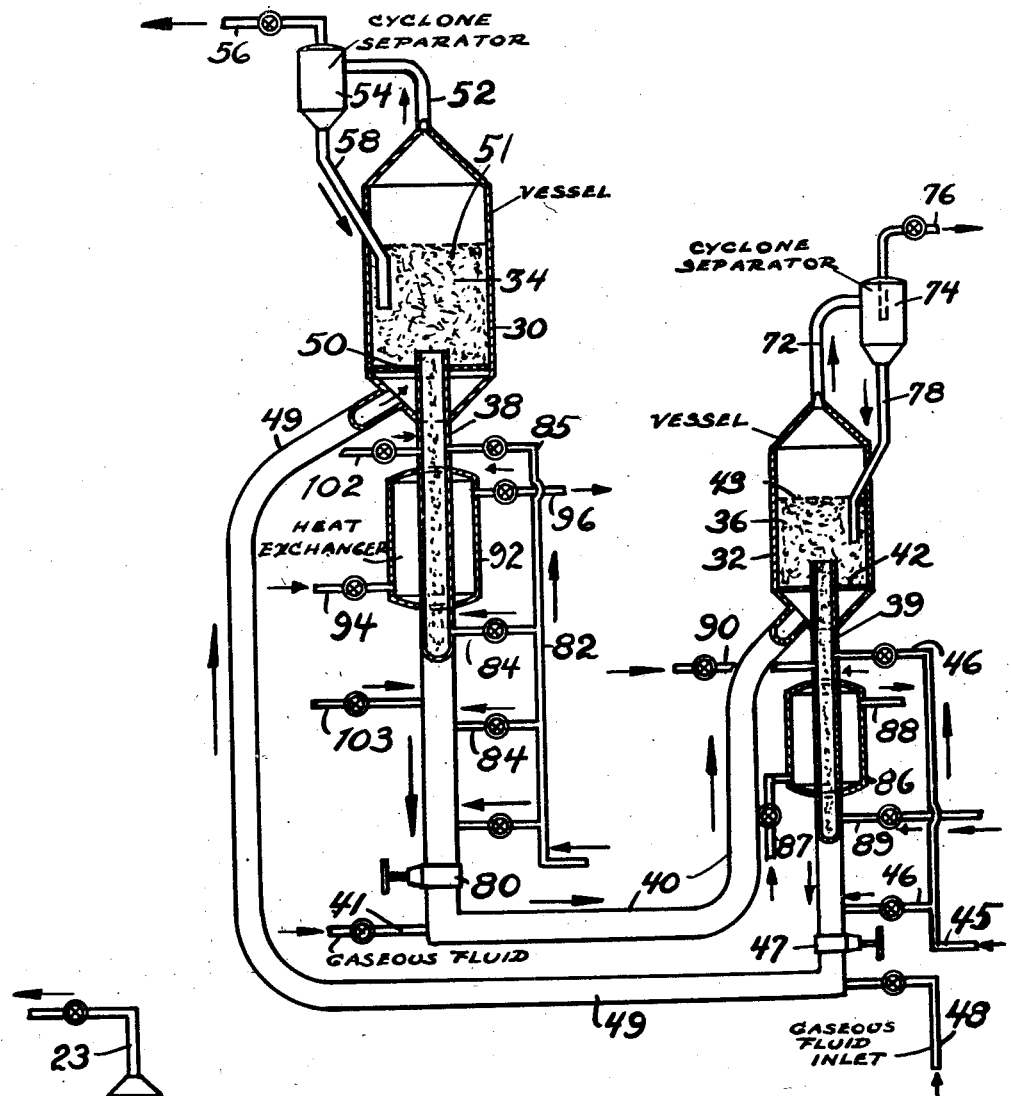
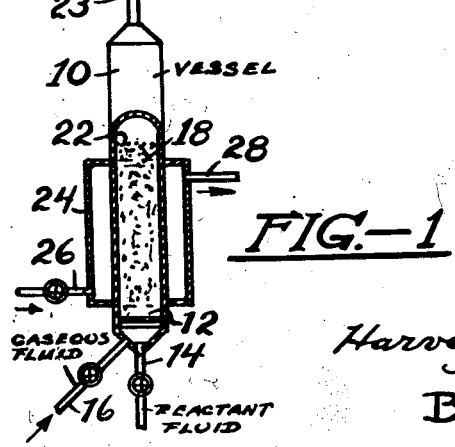
FIG.-2
FIG.-1
Harvey E. W. Burnside Inventor
By P. L. Young Attorney Patented July 26, 1949

UNITED STATES PATENT OFFICE 2,477,042

METHOD OF HEAT EXCHANGE IN FLUIDIZED HYDROCARBON CONVERSION SYSTEMS

Harvey E. W. Burnside, Elizabeth, N. J., assignor to Standard Oil Development Company, a corporation of Delaware Application March 10, 1943, Serial No. 478,668

2 Claims. (Cl. 196—52)

1

This invention relates to controlling rates of heat transfer to or from bodies of fluidized powdered materials.

Powdered material may be mixed with a gaseous medium to form a fluidized mixture which assumes some of the characteristics of a liquid. By using such a fluidized powdered material in a standpipe, pressure is developed and powdered material under superatmospheric pressure may be introduced into a zone of pressure higher than that on the powdered material before fluidizing.

Such fluidized powdered material may be used where it is desired to contact gaseous material with a powdered material and may be used in various reactions or treatments as for example where the gaseous material is a reactant or reactants and the powdered material is a catalyst; or the powdered material may be the material acted on by the gaseous medium, etc.

In chemical reactions where it is important to control the temperature and where fluidized powdered material is being used it is known to use heat exchangers whereby fluidized powdered material is in indirect heat exchange relation with a cooling or heating medium. According to my invention the rate of heat transfer from the powdered material in fluidized condition may be varied and controlled as desired by varying the amount of aerating or fluidizing gas introduced into the powdered material. Or, the rate of introducing the aerating or fluidizing gas may be kept constant and the rate of addition of powdered material may be varied.

If the rate of feed of aerating gas is kept constant, the rate of heat transfer varies inversely with the rate of feeding of the powdered material to the standpipe or other vessel. Or, the rate of feeding of the powdered material to the standpipe or other vessel may be held constant and the rate of feed of aerating or fluidizing gas may be varied. If desired, an aerating gas may be used in addition to the reactant gas or gases to vary the density of the fluidized powdered material without changing the ratio of powdered material to the reactant gas or gases.

My invention is applicable to all processes wherein powdered material is fluidized by introducing gaseous material into a confined body of the powdered material and wherein it is desired to add heat to or remove heat from the powdered material. For example, in a catalytic reaction where it is desired to remove heat from the powdered material at a certain rate by known heat exchange means it is important to be able to change the rate of heat removal whenever the rate of flow of catalyst through the standpipe or vessel changes.

According to my invention the rate of heat transfer may be controlled in heat exchangers used with fluidized powdered material by varying the amount of gaseous material fed into the fluidized powdered material or by varying the relative amounts of powdered material added to a vessel and of the aerating gaseous material.

In the drawing:

Fig. 1 represents a simple form of apparatus which may be used for carrying out my invention; and Fig. 2 represents another form of apparatus which may be used in carrying out my invention.

Referring now to the drawing, the reference character 10 designates a vessel provided with a distribution plate or grid member 12 at its lower portion. Reactant fluid is introduced into the bottom of the vessel 10 through line 14. Additional gaseous fluid may be introduced into the lower portion of the vessel through line 16. The additional gaseous fluid may be reactant fluid or inert gaseous material. The distribution plate 12 acts to distribute the gaseous fluid evenly over the cross-sectional area of the vessel and into the powdered material 18.

The gaseous fluid passing upwardly through the powdered material is maintained at a rate to fluidize the powdered material so that the powdered material has a level as indicated at 22. Gases or vapors leave the top of the vessel 10 through line 23. Surrounding or inside the vessel 10 is a heat exchanger 24 provided with an inlet 26 and an outlet 28 for passing a heat exchange medium through the heat exchanger. Instead of maintaining the powdered material within the reaction vessel 10, it is within the contemplation of my invention to introduce reactant gaseous material or other gaseous fluid and powdered material through line 14 and to withdraw powdered material and gaseous fluid through line 23 from the top of the vessel 10. Or a mixture of gaseous fluid and powdered material may be introduced into vessel 10 and powdered material as a dense fluidized material may be withdrawn from the lower portion of vessel 10. In such cases it is also contemplated to maintain a level 22 of the powdered material in the vessel 10.

The apparatus shown in Fig. 1 may be used for endothermic or exothermic reactions. A hydrocarbon cracking operation is endothermic. Regeneration of spent catalyst with air is exothermic. These are only illustrations and are not intended as limiting. In an exothermic process it is important in most cases to prevent the temperature from rising too high and my invention may be used to remove more heat from the fluidized mixture 18 in the vessel 10. When it is desired to increase the rate of heat transfer, additional gaseous fluid is introduced through line 16 to reduce the density of the fluidized mixture and to increase the turbulence of the solid particles in the fluidized mixture. Under these conditions more heat will be taken away by the cooling medium in the heat exchange apparatus 24, it being understood that the rate of flow of the cooling medium is constant. Likewise the amount of heat added to an endothermic reaction may be varied by varying the density and turbulence of the fluidized powdered mixture while maintaining the rate of flow of heat exchange medium constant.

In Fig. 2 I have shown an apparatus in which powdered material is circulated during the operation of the process. The apparatus may be used for various reactions but will be specifically described in connection with the catalytic cracking of hydrocarbons. Vessels 30 and 32 are provided for containing fluidized powdered material. Vessel 30 is shown with a body 34 of fluidized powdered catalyst or contact material and vessel 32 is shown as provided with a body of powdered catalyst or contact material 36. In a catalytic cracking operation the vessel 32 is a reaction zone or conversion zone and vessel 30 is a regeneration zone for removing carbonaceous material deposited on the catalyst particles during the conversion operation.

Associated with vessel 30 is a standpipe 38 and associated with the vessel 32 is a standpipe 39. Both of these standpipes extend through the bottom of each respective vessel upwardly into the body of fluidized material for removing fluidized powdered material from the lower portion of each vessel.

Reactant fluid or other gaseous fluid is introduced into line 40 through line 41 where it is mixed with powdered material from the bottom of standpipe 38. In the catalytic cracking of hydrocarbons the reactant fluid is either partly preheated hydrocarbon liquid or hydrocarbon vapors substantially at cracking temperature and the powdered material is a powdered catalyst such as acid treated bentonite clay, other cracking clays, synthetic silica gels impregnated or coprecipitated with alumina, magnesia, etc. Where the hydrocarbon is introduced as a liquid, the hot powdered material is used in sufficient amount to supply the heat necessary to vaporize and crack the hydrocarbon.

The mixture of gaseous fluid and powdered material is then introduced into the bottom portion of vessel 32 below a distribution plate 42 to distribute the mixture substantially uniformly across the cross-sectional area of the vessel 32. The velocity of the gaseous fluid is selected to maintain the powdered material in a fluidized condition with a level indicated at 43. Reaction products or gaseous fluid is taken overhead as will be presently described.

During the operation of certain processes the powdered material becomes fouled and must be regenerated before it is reused. For example, in the catalytic cracking of hydrocarbons a carbonaceous deposit is laid down on the catalyst particles and the activity of the catalyst is reduced. The fouled powdered material is withdrawn from the vessel 32 by means of standpipe 39 and as the powdered material is in fluidized condition it develops static pressure at the bottom of the standpipe 39. Preferably aerating gas which may be air, steam or an inert gas is introduced through line 45 and branch lines 46 into the standpipe 39 at spaced points to maintain the powdered material in fluidized condition in the standpipe 39. Where acid treated bentonite clays are used and the clays have a size of about 200 to 400 standard mesh or finer, the density of the fluidized mixture in the standpipe 39 is about 15 to 40 lbs. per cubic foot. In the vessel 32 with the same clay, the density of the fluidized mixture is about 5 to 35 lbs. per cubic foot.

The bottom of the standpipe 39 is provided with a slide valve 47 for controlling the rate of flow of fluidized powdered material from the standpipe 39. Gaseous regenerating fluid is passed through line 48 and introduced into the contaminated powdered material passing through line 49 and the mixture is passed upwardly into the bottom portion of the vessel 30 below distribution plate 50. The velocity of the regenerating gas is so selected that the powdered material in the vessel 30 is fluidized and has a level indicated at 51.

The vessel 32 is preferably under a slight superatmospheric pressure and this pressure plus the static pressure at the bottom of standpipe 39 is sufficient to move the less dense mixture in line 49 to the vessel 30 which is at a higher level than the vessel 32.

Where the powdered material is regenerated by burning carbonaceous material from the powdered material, the regeneration gases pass overhead from the vessel 30 through line 52 and pass to a separating means 54 for separating entrained powdered material from the gases. The separated gases pass overhead from the separating means through line 56 and may be passed through additional separating means and then through a Cottrell precipitator. The separating means is shown in the drawing as a cyclone separator, but other separating means may be used. The separated solid material is returned through line 58 to the body 34 of the powdered material in the vessel 30.

Returning now to the vessel 32, the reaction products or gaseous fluid leaves the top of the vessel through line 72 and is passed to a separating means 74 for separating entrained powdered material from the gaseous fluid. The separated gaseous fluid passes overhead through line 76 and where the process is a catalytic cracking one the reaction products in vapor form passing through line 76 are introduced into a fractionating system or other system for separating desired hydrocarbons from the reaction products. The separated powdered material passes from the separating means through line 78 and is returned to the body 36 in the powdered material in the vessel 32. The separating means is shown in the drawing as a cyclone separator but other separating means may be used. Also, one or more cyclone separators may be used and where one or more cyclone separators are used, the return pipes preferably dip under the level 43 of the powdered material 36 in the vessel 32.

Returning now to the vessel 30, regenerated powdered material is withdrawn from the bottom portion of the vessel through standpipe 38 and is passed to the line 40 previously described wherein the regenerated catalyst is mixed with gaseous fluid before being passed to the vessel 32. A slide valve 80 is provided at the bottom of the standpipe 38 for controlling the rate of flow of regenerated powdered material from the bottom of standpipe 38.

The powdered material in standpipe 38 is preferably aerated by introducing air, steam or inert gas through line 82 having branch lines 84. The branch lines introduce aerating gas into the powdered material in the standpipe 38 at spaced points. It is noted that branch line 85 introduces aerating gas into the upper portion of the standpipe 38 above the heat exchanger 92.

The heat exchanger 86 surrounds or may be located inside a portion of the standpipe 39 containing the powdered material which is to be regenerated. The heat exchanger 86 has an inlet 87 and an outlet 88 whereby cooling medium such as water or other heat exchange mediums may be circulated. In certain exothermic regeneration operations such as in the regeneration of catalyst used in a catalytic cracking operation where carbonaceous material is burned from the catalyst it is necessary to carefully control the temperature during regeneration to prevent heating of the catalyst particles higher than about 1200° F. The heat exchanger 86 is provided to remove heat from the catalyst or powdered material entering the regenerator and thus control the regenerator temperature.

According to my invention, the rate of removing heat from the standpipe 39 may be varied and controlled by maintaining the rate of feed of aeration gas constant and changing the amount of catalyst or powdered material passing downwardly through the standpipe 39 or by maintaining the rate of flow of powdered material through the standpipe 39 constant and changing the rate of flow of aeration gas. Where it is desired to increase the rate of heat removal from the powdered catalyst in the standpipe 39, one method comprises maintaining the rate of flow of catalyst constant and introducing additional aerating gaseous fluid which may be a reactant gas or vapor or an inert gas into the standpipe 39 through a line which may be located a short distance either below (line 89) or above (line 90) the heat exchanger 86.

In regenerating powdered acid treated bentonite clay catalyst used in the cracking operation where the particle size is as above described, of aeration gas added at lines 102 and/or 103. By these means the temperature of the catalyst entering line 40 and vessel 32 may be controlled, thus controlling the temperature in vessel 32.

Where a catalytic cracking operation is being practiced, the temperature of the cracking zone 32 may be maintained between about 800° F. and 1000° F. Where relatively light feed stocks are used for the production of aviation gasoline, temperatures as low as 700° F. may be used. Where relatively light hydrocarbons are to be dehydrogenated, temperatures as high as 1250° F. may be used.

Where more rugged catalysts are used, temperatures higher than 1200° F. during regeneration may be tolerated.

The following examples are included to show that the rate of heat transfer may be varied as desired according to my invention.

With the standpipe 38 of a size of about 11.5 square inches in cross-section the following data were obtained with supply of aeration gas maintained substantially constant. The standpipe was about 25 feet in length.

| Catalyst Rate, lbs./Min. passing through standpipe | Heat Transfer Rate, B. t. u./ Hr./Sq. Ft. | Average Catalyst Temp., °F. passing through Heat Exchanger |
|---|---|---|
| 34 | 10,950 | 960 |
| 54 | 8,620 | 990 |
| 68 | 3,880 | 1,040 |

In the above example it will be seen that the rate of heat transfer varies inversely with the catalyst rate.

Additional data on the same size standpipe were obtained as follows:

Heat transfer in spent catalyst standpipe heat exchanger

| Catalyst | Catalyst Rate, Lbs./Min./Sq. Ft. of Standpipe Cross-section | Average Catalyst Temp., °F. passing through the heat exchanger | Aeration [1] Gas Rate CFM/Sq. Ft. of Standpipe Cross-section | Rate of Heat Transfer, B. t. u./Hr./ Sq. Ft. of Exchanger Area | Heat Transfer Coefficient, B. t. u./Hr./ Sq. Ft./° F. |
|---|---|---|---|---|---|
| Silica-Alumina | 670 | 765 | 68 | 25,400 | 75 |
| Do | 2,000 | 855 | 14.1 | 29,100 | 81 |
| Do | 1,500 | 855 | 14.1 | 26,600 | 70 |
| Super Filtrol | 1,190 | 910 | 7.3 | 12,400 | 23 |
| Do | 1,000 | 995 | 2.3 | 3,600 | 4.7 |
| Do | 454 | 915 | 12.0 | 5,250 | 7.6 |
| Do | 1,120 | 1,000 | 2.3 | 2,300 | 2.7 |

[1] The gas rate tabulated here is that measured at standard conditions and introduced through line 89 4½ feet below the bottom of the heat exchanger 86. Constant rates of addition of inert gas were maintained at two other points in the standpipe 39, one above (2.3 CFM/Sq. Ft.) and one below (1.8 CFM/Sq. Ft.) the heat exchanger 86. Point above is through top line 46 and one below is through bottom line 46. CFM means cubic feet per minute.

the density of the fluidized mixture in regeneration vessel 30 is about 5 to 35 lbs. per cubic foot and the density of the fluidized mixture in standpipe 38 is about 15 to 40 lbs. per cubic foot. Heat exchanger 92 is provided for standpipe 38 and may be inside or outside standpipe 38. Heat exchanger 92 has inlet 94 and outlet 96 for a heat exchange medium. By introducing additional aeration gas which may be air or inert gas through a line which may be located either above (line 102) or below (line 103) heat exchanger 92, the density of the fluidized mixture in the standpipe 38 is decreased and the catalyst particles have increased turbulent motion so that more heat is removed from the fluidized mixture by means of the heat exchanger 92.

Similarly, the heat removal rate may be decreased in exchanger 92 by decreasing the amount In the catalytic cracking of certain feed stocks, especially reduced crude oils, using powdered catalyst it has been found that the catalyst loses activity as its age increases. To maintain a substantially constant conversion level it is necessary to raise the catalyst to oil ratio. In a heat balanced unit such as is shown in Fig. 2, which operates without recycling of catalyst, it is desirable to provide a cooler 92, designed for heat transfer rate control by means of aeration gas adjustment, on the regenerated catalyst standpipe 38 to permit control of the temperature in reactor 32. Another heat exchanger 86 is used on the spent catalyst standpipe 39 to control regeneration temperature in the regenerator 30. The following examples show the difference in the rate of heat removal in the regenerated catalyst standpipe 38 which would be required for operation at the same reactor temperatures, same regenerator temperatures and same conversion level with catalysts of different activities. These examples relate to a commercial catalytic cracking plant for hydrocarbons.

Example I

Basis: 1000 barrels per day, liquid injection.
Feed: Arkansas-Louisiana crude bottoms (27.5° API)
Catalyst: Acid treated bentonite clay: 200–400 standard mesh.
Operating conditions:
    Average regenerator temp.=1150° F.
    Average reaction temp.=980° F.
    Catalyst activity=23% unstabilized gasoline.
    100 minus volume per cent cycle oil=60
    Catalyst-to-oil ratio by weight required=8.5
    Solids-to-oil ratio by weight=18
    Liquid feed injection-feed preheated to about 400° F.
Thermal properties:
    Specific heat of solids mixture=0.26 B. t. u./lb./°F.
    Specific heat of feed vapor=0.66 B. t. u./lb./°F.
    Latent heat of vaporization of feed (at 400° F.)=100 B. t. u./lb.
    Heat of cracking=80 B. t. u./lb. feed converted.
Regenerated catalyst standpipe heat exchanger:
    Temperature at standpipe bottom=1091° F.
    Heat removal required=546,000 B. t. u./hr.
    If preheat desired in water to exchanger=50° F., then water rate to exchanger=1,300 gal./hr.
    If area of exchanger=100 sq. ft., overall heat transfer coefficient required=5.5 B. t. u./hr./sq. ft./°F.
    Aeration gas velocity is approximately=0.1 to 0.3 ft./sec.

Example II

Same basis as for Case I.
Operating conditions:
    Same as for Case I except catalyst activity has decreased to 17.5% unstabilized gasoline.
    Catalyst-to-oil ratio by weight required=10
    Solids-to-oil ratio by weight=26.5
Regenerated catalyst standpipe heat exchanger:
    Temperature at standpipe bottom=1056° F.
    Heat removal required=3,940,000 B. t. u./hr.
    If water rate is unchanged (1,300 gal./hr), the water may be preheated 362° F. at 350 lbs./sq. in. vapor pressure (if 70° F. at inlet) or 3,420 lbs./hr. of water may be vaporized at 115 lbs./sq. in. pressure.
    If area of heat exchanger=100 sq. ft., overall heat transfer coefficient required=46 B. t. u./hr./sq. ft./°F.
    Aeration gas velocity is approximately=1 to 2 feet per second.

The removal of greatly different amounts of heat from the regenerated catalyst standpipe 38 required to maintain the desired operating conditions in the two examples above set forth can be easily accomplished with my invention by varying the aeration gas velocity. The examples above given cover the case where the activity of the catalyst drops off and my invention is not to be restricted thereto as it may be used in other cases such as different feed stock and different reactor temperature, different catalyst to oil ratios, etc.

While the invention has been broadly described in connection with powdered material and more specifically described in connection with the catalytic cracking of hydrocarbons, it is to be understood that my invention has broad application for controlling the rate of heat transfer from bodies of fluidized material and may be used in connection with any processes wherein it is desired to control the rate of heat transfer to or from a fluidized powdered mixture. More specifically, my invention may be used in the Fischer synthesis where carbon monoxide and hydrogen are combined in the presence of a catalyst to produce higher boiling hydrocarbons, catalytic polymerization of hydrocarbons or other organic compounds, catalytic dehydrogenation of hydrocarbons, alcohols, etc., catalytic isomerization, catalytic reforming of virgin or cracked naphthas, clay treating of hydrocarbon oils such as gasoline, kerosene, heating oils, etc.

I claim:
1. A method of converting hydrocarbons which comprises mixing gaseous fluid hydrocarbons with powdered catalyst under conditions of temperature and pressure to obtain the desired extent of conversion and to produce a relatively dense dry fluidized mixture of catalyst in a reaction zone having characteristics of a liquid, withdrawing hot spent catalyst from said reaction zone as a relatively dense mixture into a standpipe wherein the powdered material is maintained in a fluidized condition by the presence of fluidizing gaseous fluid and having characteristics of a liquid and then passing the powdered material to a regeneration zone where it is regenerated in the presence of an oxygen-containing gas, removing heat from the spent catalyst in the standpipe by indirect heat exchange and controlling the rate of heat transfer by changing the density of the dense mixture in said standpipe while retaining its fluidized characteristics by changing the amount of gaseous fluid present in the standpipe thereby varying the relative amounts of powdered catalyst and gaseous fluid in the mixture in the standpipe.

2. A method according to claim 1 wherein the density of the dense mixture is decreased by adding an aerating gas thereto and the turbulence of the mixture is increased to increase the rate of heat transfer.

HARVEY E. W. BURNSIDE.

REFERENCES CITED

The following references are of record in the file of this patent:

UNITED STATES PATENTS

| Number | Name | Date |
|---|---|---|
| 1,688,325 | Bell | Oct. 23, 1928 |
| 1,840,857 | Testrup et al. | Jan. 12, 1932 |
| 1,877,322 | Hulse | Sept. 13, 1932 |
| 2,201,552 | Ahlmann | May 21, 1940 |
| 2,302,209 | Goddin, Jr. | Nov. 17, 1942 |
| 2,311,984 | Guild | Feb. 23, 1943 |
| 2,348,009 | Johnson et al. | May 2, 1944 |
| 2,360,463 | Arveson | Oct. 17, 1944 |
| 2,373,008 | Becker | Apr. 3, 1945 |

FOREIGN PATENTS

| Number | Country | Date |
|---|---|---|
| 115,689 | Australia | Aug. 20, 1942 |